Patented Dec. 1, 1953

2,661,359

UNITED STATES PATENT OFFICE 2,661,359

METHOD OF PREPARING ADDUCTS

Joachim Dazzi, Dayton, Ohio, assignor to Monsanto Chemical Company, St. Louis, Mo., a corporation of Delaware No Drawing. Application February 15, 1950,
Serial No. 144,393

3 Claims. (Cl. 260—404.8)

This invention relates to improvements in the preparation of adducts formed by the addition reaction of maleic anhydride with olefinic, nonconjugated, unsubstituted fatty acids of from 10 to 24 carbon atoms, and esters of said acids. It has particular reference to improving the color and clarity of such adducts.

The preparation of adducts by reaction of maleic anhydride with unsaturated fatty acids is well-known. (See U. S. Patent No. 2,188,882 to Clocker and the article by Ross, Gebhart and Gerecht, which appears in the Journal of the American Chemical Society, p. 1373 (1946).) While the structure of such adducts has not been definitely determined, it is believed that addition of the fatty acid or ester thereof, occurs at the double bond of the dicarboxylic acid. For example, the maleic anhydride-oleic acid adduct probably has the structure:

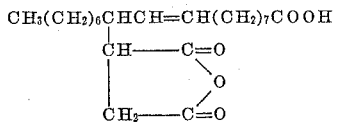

Owing to uncertainty of the position of the fatty acid carbon at which attachment of the dicarboxylic residue occurs, as well as for the sake of brevity, the term "adducts" employed hereinafter will refer to the equimolar addition products of maleic anhydride and a fatty acid compound having the general formula:

wherein Y is an olefinic, aliphatic, hydrocarbon residue of from 9 to 23 carbon atoms and Z is an alkyl group of from 1 to 8 carbon atoms, and hydrogen.

Such adducts, as pointed out in the Clocker patent referred to above as well as in my copending patent applications, Serial Nos. 144,391 and 144,392, filed February 15, 1950 and issued as U. S. Patent Numbers 2,569,404–5, respectively, both dated Septembr 25, 1951, are compounds of great potential use in the chemical and related industries. Actual utilization of the adducts, however, has been somewhat limited by their poor color. For example, when following the procedure employed in the Clocker patent there are generally obtained, even when using very pure grades of reactants, opaque reaction materials of a dark color that makes them unsuitable for many uses for which they could be otherwise employed.

Accordingly, an object of the present invention is to provide a method for improving the color of such adducts.

Another object of the invention is to provide a method for preventing, or at least minimizing decolorization of the product in the addition reaction of maleic anhydride and olefinic, nonconjugated, unsubstituted fatty acids of from 10 to 24 carbon atoms or esters of such acids.

These and other objects of the invention may be accomplished by the process of the invention which comprises using with the maleic anhydride and the fatty acid compound a small amount of an inorganic oxyacid of phosphorus or an ester thereof. While I do not know the mechanism of the color-inhibiting effect of such phosphorus compounds when employed in the reaction mixture it may be assumed that they either react with some impurity or impurities that may be present in the reactants or that they retard side reactions which contribute to the darkening of the desired adducts. Inasmuch as the addition reaction readily takes place in the absence of the phosphorus compounds, the action of the added material cannot be considered to be catalytic. Only very small quantities of the phosphorus compound need to be employed, say, from 0.5 per cent by weight to 5 per cent by weight of the maleic anhydride employed. Less than 0.3 per cent generally has substantially no decolorizing effect and while quantities in excess of 5 per cent may be employed, for purposes of economy it is preferred to limit the range of the additive to not more than 5 per cent, this quantity being sufficient to give adducts of greatly improved color.

Phosphorus compounds employed in the present invention comprise the various acids, e. g., orthophosphoric acid, metaphosphoric acid, pyrophosphoric acid, hypophosphoric acid, orthophosphorous acid, hypophosphorous acid and pyrophosphorous acid. Partial or total esters of acids may be used instead of the free acids, i. e., esters of said phosphorus acids with aliphatic, alicyclic, aralkyl, or heterocyclic hydroxy compounds, e. g., tri-n-butyl phosphate, tri-phenyl phosphate, dibenzyl pyrophosphate, mono-cyclohexyl hypophosphate, tri-furyl phosphate, etc. Particularly useful are the alkyl and aryl esters in general and the following aliphatic and aromatic esters: triethyl phosphite, di(β-chloroethyl) phosphite, tris(β-butoxyethyl) phosphite, 2 - ethylhexyl metaphosphate, lauryl phosphate, tri-o-cresyl phosphite, β-naphthyl phosphite, tri-p-anisyl phosphite, and tri(4-nitrophenyl) phosphite.

and are based on the determination of unreacted maleic anhydride found in the filtrate and in the solid residue. This method was also checked by polarographic determination of maleic anhydride found in the filtrate before and after the water wash.

*Table I*

| Experiment No. | 1 | 2 | 3 | 4 | 5 | 13 | 15 |
|---|---|---|---|---|---|---|---|
| Emersol-233 [1] | 13.8 | | 13.8 | | 13.8 | | 282.5 |
| Ahcolein-810 [1] | | 13.8 | | 13.8 | | | |
| 10-Undecylenic Acid | | | | | | 368.5 | |
| Maleic Anhydride | 6.0 | 6.0 | 6.0 | 6.0 | 6.0 | 246 | 122.5 |
| Triphenyl Phosphite [2] (percent) | 1.0 | 1.0 | 2.0 | 2.0 | 0.0 | 2.0 | 2.0 |
| Mole Ratio: Maleic Anhydride: Fatty Acid | 1.25 | 1.25 | 1.25 | 1.25 | 1.25 | 1.25 | 1.25 |
| Heating Time [3] (Hrs.) | 4 | 4 | 4 | 4 | 4 | 4 | 6 |
| Temperature, °C | 209 | 209 | 209 | 209 | 209 | 218 | 200 |
| Color [4] | 13.0 | 12.0 | 14.2 | 12.0 | 16.6 | 13.7 | 12.0 |

[1] Emersol-233 (Emery Ind.) and Ahcolein-810 (Arnold, Hoffman) represent distilled oleic acid, technical.
[2] Based on charged maleic anhydride.
[3] After reaction mixture had been brought to 200° C.
[4] Gardner Scale (Gardner Color Standards for Varnishes, Oils and Lacquers).

The invention is further illustrated, but not limited by the following examples:

EXAMPLE 1

In this example there is summarized a series of experiments which were made according to the following general procedure:

Into a three-necked flask fitted with an agitator, thermometer, condenser and an inlet tube there were placed the fatty unsaturated acid, the maleic anhydride and the phosphorus compound. The molar ratio of maleic anhydride:oleic acid used varied between 1.0:1.25. The off gases or traces of maleic anhydride were collected over very diluted aqueous sodium hydroxide and a few drops of phenolphthalein.

The whole mixture was heated during a 30 minute period from room temperature up to 200° C. (liquid temperature). An inert gas, i. e., nitrogen, was bubbled through the liquid during the first 15 minutes of the half-hour heating period. After a 4 to 6 hour heating period at the temperatures indicated in the table below, the mixture was cooled to approximately 150° C., then treated with clay and a filter aid, and stirred for 30 minutes. The reaction mixture was subsequently treated with charcoal and stirring was continued for an additional 30 minutes at 150 to 165° C. The product was then filtered over a filter aid. The filtrate was diluted with ether, washed several times with water and the wash water analyzed for maleic anhydride. Low boiling materials were removed by heating the residue for 1 to 2 hours at 100° C. bath temperature at 1 mm. Hg. The yields varied between 86 to 96 per cent Quantities of reactants indicated above are parts by weight. Experiments 1 to 5 were carried out in large size test tubes, fitted with a cork stopper wrapped in metal foil, and Experiment 13 was carried out in a three-necked flask, equipped with stirrer, condenser and thermometer. Experiments 1 to 5 were heated simultaneously in the same oil bath. In Experiments 13 and 15 the unreacted maleic anhydride was removed by washing with water before measuring the color of the product.

The improvement in color which was obtained by operating in the presence of the phosphorus compound is remarkable. Thus, as shown in the above table, in the "blank" Experiment 5, the color of the adducts on the Gardner scale was 16.6. The efficiency of the introduced phosphorus compound is shown by the decreased color value of the adducts prepared in the presence of the indicated phosphorus acid or ester. Inasmuch as each unit in the upper range of the Gardner scale, i. e., in color values of from 10 to 15, represents a decidedly significant color change, the results obtained by the present process are of great industrial importance, particularly in the plastics field.

EXAMPLE 2

This example is like Example 1, except that instead of employing triphenyl phosphite as the phosphorus compound, the esters indicated in the table below were used.

*Table II*

| Experiment No. | 5 | 7 | 8 | 9 | 12 |
|---|---|---|---|---|---|
| P Compound Used | | Tri-n-butyl phosphite | Tri-n-butyl phosphite | Di-n-butyl hypo-phosphite | Tri-n-butyl phosphite. |
| Emersol-233 [1] | 13.8 | | | | |
| Ahcolein-810 [1] | | 13.8 | 13.8 | 13.8 | |
| 10-Undecylenic Acid | | | | | 9.85. |
| Maleic Anhydride | 6 | 6.0 | 6.0 | 6.0 | 6.0. |
| Percent P Compound Used [2] | 0.0 | 0.5 | 1.5 | 1.5 | 1.5. |
| Mole Ratio: Maleic Anhydride:Fatty Acid | 1.25 | 1.25 | 1.25 | 1.25 | 1.25. |
| Heating Time [3] (Hrs.) | 4 | 5 | 5 | 5 | 5. |
| Temperature, °C | 209 | 213 | 213 | 213 | 213. |
| Color [4] | 16.6 | 14.0 | 13.1 | 12.8 | 14.0. |

[1] Emersol-233 (Emery Ind.) and Ahcolein-810 (Arnold, Hoffman) represent distilled oleic acid, technical.
[2] Based on charged maleic anhydride.
[3] After reaction mixture had been brought to 200° C.
[4] Gardner Scale (Gardner Color Standards for Varnishes, Oils and Lacquers).

Quantities of reactants indicated above are parts by weight. All of the above experiments were carried out in large size test tubes, fitted with a cork stopper wrapped in metal foil, and all were heated simultaneously in the same oil bath.

Example 3

This example is like Example 1, except that instead of employing triphenyl phosphite as the phosphorus compound, the phosphorus acids indicated in the table below were used.

the quantity of either reactant actually present in the initial mixture is unimportant, in that any excess material is readily recoverable from the final reaction mixture. The reaction is effected at temperatures which are below the decomposition points of either the reactants or the product, and preferably between temperatures of say, between 150° C. to 300° C.

Table III

| Experiment No. | 5 | 10 | 11 | 14 |
|---|---|---|---|---|
| P Compound Used | | Phosphorous Acid | Phosphoric Acid | Hypophosphorous Acid. |
| Emersol-233 [1] | 13.8 | | | 212. |
| Ahcolein-810 [1] | | 13.8 | 13.8 | |
| 10-Undecylenic Acid | | | | |
| Maleic Anhydride | 6.0 | 6.0 | 6.0 | 73.5. |
| Percent P Compound Used [2] | 0.0 | 1.77 | | 3.0. |
| Mole Ratio: Maleic Anhydride: Fatty Acid | 1.25 | 1.25 | 1.25 | 1.0. |
| Heating Time [3] (Hrs.) | 4 | 5 | 5 | 6. |
| Temperature, °C | 209 | 213 | 213 | 205. |
| Color [4] | 16.6 | 13.1 | 15.0 | 12.9. |

[1] Emersol-233 (Emery Ind.) and Ahcolein-810 (Arnold, Hoffman) represent distilled oleic acid, technical.
[2] Based on charged maleic anhydride.
[3] After reaction mixture had been brought to 200° C.
[4] Gardner Scale (Gardner Color Standards for Varnishes, Oils and Lacquers).

Quantities of reactants indicated above are parts by weight. Experiments 5, 10 and 11 were carried out in large size test tubes, fitted with a cork stopper wrapped in metal foil. Experiment 14 was conducted in a three-necked flask, equipped with stirrer, condenser and thermometer. Experiments 5, 10 and 11 were heated simultaneously in the same oil bath. In Experiment 14 the unreacted maleic anhydride was removed by washing with water before measuring the color of the product.

Although the above examples show only the use of oleic acid and undecylenic acids as the fatty acid components, other olefinic, non-conjugated, unsubstituted fatty acids may be similarly reacted with maleic anhydride in the presence of the present phosphorus compounds to give adducts of good color. Also, instead of using the free fatty acids, there may be employed esters of the same with aliphatic, unsubstituted alcohols of from 1 to 8 carbon atoms, e. g., methyl, ethyl, isopropyl, n-hexyl or 2-ethylhexyl undecylenate or oleate, the adducts thus obtained being clearer and lighter in color than adducts prepared by prior methods.

While I prefer to add the phosphorus compound to the mixture of maleic anhydride and the fatty acid component before initiating the reaction, good results are also obtained when the present phosphorus compounds are added at an intermediate stage of the reaction. For example, the reaction mixture may be heated for a time of, say, one to two hours in the absence of the phosphorus compound, and the reaction interrupted for addition of the latter. However, color improvement is not so pronounced.

Inasmuch as formation of the present adducts involves addition of one mole of the maleic anhydride with one mole of the fatty acid compound, these reactants should be present in substantially stoichiometric proportions. However, While the addition of maleic anhydride with the fatty acids occurs readily at ordinary atmospheric pressures, with some reactants use of lower or greater pressures is advantageous. The addition reaction may also be effected in the presence of an inert diluent, the use of a diluent being recommended when working with the higher esters, e. g., n-octyl oleate.

What I claim is:

1. The process of preparing adducts which comprises heating, at temperatures of from 150° C. to 300° C., a mixture comprising maleic anhydride, oleic acid and an aryl ester of an acid selected from the class consisting of phosphorous acid and hypophosphorous acid, the quantity of said aryl ester being from 0.5 per cent to 5.0 per cent by weight of the weight of the maleic anhydride.

2. The process of preparing adducts which comprises heating, at temperatures of from 150° C. to 300° C., a mixture comprising maleic anhydride, oleic acid and triphenyl phosphite, the quantity of said phosphite being from 0.5 per cent to 5.0 per cent by weight of the weight of the maleic anhydride.

3. The process of preparing adducts which comprises heating, at temperatures of from 150° C. to 300° C., a mixture comprising maleic anhydride, 10-undecylenic acid, and triphenyl phosphite, the quantity of said phosphite being from 0.5 per cent to 5.0 per cent by weight of the weight of the maleic anhydride.

JOACHIM DAZZI.

References Cited in the file of this patent

UNITED STATES PATENTS

| Number | Name | Date |
|---|---|---|
| 2,306,281 | Rust | Dec. 22, 1942 |